(No Model.)
L. FALL.
SEWER TRAP.
No. 320,918. Patented June 30, 1885.
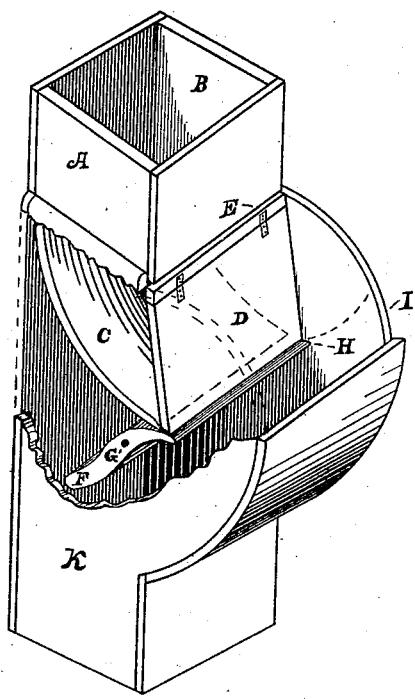
E. K. Campbell
S. A. Knight
Louis Fall,
per C. D. Campbell

UNITED STATES PATENT OFFICE.

LOUIS FALL, OF LIMA, OHIO.

SEWER-TRAP.

SPECIFICATION forming part of Letters Patent No. 320,918, dated June 30, 1835.

Application filed February 18, 1885. (No model.)

*To all whom it may concern:*

Be it known that I, LOUIS FALL, a citizen of the United States, and a resident of Lima, in the county of Allen and State of Ohio, have invented a new and useful Sewer-Trap, of which the following is a specification.

My invention consists in an improvement in sewer-traps and, essentially, in providing a trap that will automatically open to allow of the passage of a small amount of water or other substance or open wider to allow larger bodies to pass, and which is so constructed that no sediment, garbage, or other deposit can choke the trap. It also closes automatically to keep the gas from arising from the sewer.

The figure shows my box and trap in perspective with part of the side of the box cut away to show the chute, the pivoted door, and balanced pivoted drop that forms a continuation of the chute.

A represents the box or passage from the man-hole to the sewer; B, entrance to the same; C, an inclined or curved chute down which the sewage is conducted to the trap; D, a hinged door that shuts down tight against the pivoted piece F; E, hinges of the door; F, pivoted balanced piece that forms an extension of the chute or slide C; G, the pivot of piece F; H, lip of the pivoted piece F; I, a rounded enlargement of box A; K, bottom of box A through which sewage passes into the sewer.

The operation and construction of my apparatus is substantially as follows: The chute leading from the man-hole to the sewer I make of the shape shown, being of general rectangular shape, having a rounded enlargement at one side. Opposite to the top of this enlargement I start a chute at an angle of about forty-five degrees, or slightly curved, down which the water and other substances pass. Just below the chute or incline C, I pivot a lip, the upper part of which forms a continuation of the incline C. Opposite the top of the chute I hinge the door D, the bottom of which presses tightly against the lip H. As the water or other substances pass down the chute the pivoted piece F yields or turns on its pivot allowing it to pass out. Immediately on its passage the lip F returns to place, forming a close joint that prevents the escape of gases from the sewer up through the trap. When larger bodies descend, or when if matter should accumulate on the lip F, the pressure against the door D causes it to open and allow them to escape. Both piece F and door D close again after the passage of any bodies, and gases are prevented arising, as stated.

My trap is adapted to public sewers or to pipes leading from residences to the sewer.

What I claim as new is—

In a sewer-trap, the combination, with the chute C and pivoted piece F, forming a continuation of the chute, of the pivoted door D, as and for the purpose set forth.

LOUIS FALL.

Witnesses:
E. GALE,
W. A. CAMPBELL.